United States Patent [19]

Kittel et al.

[11] Patent Number: 4,852,419
[45] Date of Patent: Aug. 1, 1989

[54] CONTROL DEVICE, IN PARTICULAR FOR A MOTOR-VEHICLE FRICTION CLUTCH

[75] Inventors: Friedrich Kittel; Dieter Lutz, both of Schweinfurt; Franz Nagler, Gädheim; Horst Oppitz, Dittelbrunn; Gerhard Gasper, Schweinfurt, all of Fed. Rep. of Germany

[73] Assignee: Sachs Systemtechnik GmbH, Schweinfurt, Fed. Rep. of Germany

[21] Appl. No.: 160,646

[22] Filed: Feb. 26, 1988

[30] Foreign Application Priority Data

Mar. 3, 1987 [DE] Fed. Rep. of Germany ....... 3706849

[51] Int. Cl.⁴ ...................... F16H 55/22; F16H 21/54; F16D 25/00
[52] U.S. Cl. ........................ 74/89.14; 74/97; 74/425; 192/84 R; 192/85 R; 338/74
[58] Field of Search .......................... 60/538, 545, 594; 74/89.14, 97, 109, 425; 192/84 R, 85 R, 99 S; 338/174

[56] References Cited

U.S. PATENT DOCUMENTS

| | | | |
|---|---|---|---|
| 1,871,063 | 8/1932 | Jimmis | 74/109 |
| 2,197,554 | 4/1940 | Lawrence | 60/594 |
| 3,446,085 | 5/1969 | Ginsberg | 74/89.14 |
| 4,224,832 | 9/1980 | Prohaska et al. | 60/545 X |
| 4,591,034 | 5/1986 | Tellert et al. | 192/84 R |
| 4,650,056 | 3/1987 | Sevennec et al. | 192/99 S X |
| 4,671,400 | 6/1987 | Grunberg et al. | 192/99 S X |
| 4,744,450 | 5/1988 | Bertin et al. | 192/99 S X |

FOREIGN PATENT DOCUMENTS 3438594 4/1986 Fed. Rep. of Germany .
2153479 8/1985 United Kingdom .

Primary Examiner—Alan D. Hermann
Attorney, Agent, or Firm—Toren, McGeady & Associates

[57] ABSTRACT

The control device for a motor-vehicle friction clutch incorporates an electric motor which drives an output member in a substantially translational motion through a motion conversion crank gear unit designed as a worm gearing. This axis of a worm of the crank gear unit and the resultant drive force exerted on the output member by the assigned worm gearwheel lie in a common plane normal to the axis of rotation of the worm gearwheel. A spring-type energy accumulator supports the drive motion of the electric motor in the release direction of the clutch and is tensioned in the engagement direction by the electric motor. In this way a comparatively small-sized electric motor can also be used for rapid release movements.

19 Claims, 4 Drawing Sheets

CONTROL DEVICE, IN PARTICULAR FOR A MOTOR-VEHICLE FRICTION CLUTCH

BACKGROUND OF THE INVENTION

The invention concerns a control device, in particular for a motor-vehicle friction clutch.

There is known from German Patent application No. 34 38 594 a motor-vehicle friction clutch which is engaged and released through a servo actuator. The servo actuator is controlled by a set-point adjuster coupled with the clutch pedal. The actuator incorporates an electric motor which actuates the master cylinder of a hydraulic clutch release system through a crank gear. A position transmitter connected with the electric motor measures at the same time the actual position of the actuator.

The invention is directed towards provision of an operationally reliable electric-motor-driven control device of simple design which is particularly suitable for driving the release devices of a motor-vehicle friction clutch.

SUMMARY OF THE INVENTION

The control device according to the invention incorporates a motion conversion crank gear unit in the form of a worm gear which converts the rotary motion of the drive shaft of an electric motor into a substantially translational motion of an output member acting on a release system of the friction clutch. The crank gear unit has a gear case which in order to simplify fitting of the control device forms a unit with the electric motor. In the gear case is pivoted a worm gearwheel which meshes with a worm preferably located directly on the drive shaft of the electric motor. The worm gearwheel forms at the same time the crank of the crank gear unit on which the output member is mounted eccentrically to the axis of rotation of the worm gearwheel swivellably on the latter. The mounting of the output member on the worm gearwheel and the orientation of the worm relative to the worm gearwheel are chosen in such a way that the axis of rotation of the worm and the resultant force exerted on the output member by the worm gearwheel lie substantially in a common plane normal to the axis of rotation of the worm gearwheel. This results in the bearing of the worm gearwheel being loaded in a radial direction exclusively symmetrically and not being exposed to any tilting forces. The service life and operational safety of the control device can thus be increased at the cost of comparatively little design work.

In a preferred form the worm gearwheel has two cheeks best formed of sheet-metal discs, between which the output member mounted on the cheeks engages. In this way it is also impossible for a tilting force to be exerted through the articulation of the output member on the worm gearwheel supported axially on both sides and hence symmetrically to the gear case. The worm toothing is provided on the peripheral shell of a segmental gearwheel held between the metal discs. Preferably said gear is made of plastic in order to reduce the friction.

The electric motor must be designed in such a way that it can release the clutch in a comparatively short time, for example fractions of a second. This in itself would pre-suppose comparatively powerful motors. On the other hand the time interval usually required for engaging the clutch is a multiple of the release time if the clutch is to engage free from jerks. A preferred embodiment of the invention makes use of this state of affairs. In this embodiment a spring-type energy accumulator likewise acting on the worm gearwheel supports the electric motor during the movement in the release direction, so that the release movement takes place rapidly. In the engaging direction the spring-type energy accumulator is stretched by the electric motor through the worm gearwheel, the motor being supported by the clutch spring. The electric motor can in this way be of smaller size. The spring-type energy accumulator incorporates best at least one compression spring, for example, at least one helical compression spring. Other kinds of spring-type energy accumulators are also suitable, however, in particular accumulators in the form of gas pressure springs.

The points of application of the spring-type energy accumulator tensioned between gear wormwheel and gear case lie in the end position of the worm gearwheel assigned to the stretched accumulator which is best located at least approximately in a plane containing the axis of rotation of the worm gearwheel. In this way the components of the release system and also the bearings of the electric motor are largely destressed when the clutch is engaged. A slightly off-dead-center position of the spring-type energy accumulator is however of advantage for the stabilization of this end position.

A further aspect of the invention concerns the best form of a measured value transmitter connected with the control device, said transmitter being provided for the production of an actual value signal assigned to the instantaneous position of the output member. The output signal of such a measured value transmitter must with fitted clutch be able to be set electrically or mechanically in accordance with the actual position of the output member. In a preferred form of the invention there is attached to the gear case a rotary potentiometer forming the measured value transmitter, the wiper of which sits rotationally adjustable on the end of a shaft connected firmly with the worm gearwheel and rotatably supported in the gear case. The shaft is preferably designed as a hollow shaft so that the wiper in particular even with a totally enclosed potentiometer is accessible for the rotational setting through the hollow shaft. Preferably the wiper is held by a force fit on the shaft.

The bearing pressure with which the normally spring-mounted wiper rests on a resistance track of the potentiometer fixed to the gear case must lie within predetermined, comparatively narrow tolerances in order not to affect the function of the potentiometer. In a preferred form the wiper is therefore axially supported through an axial bearing on a lid part covering the resistance track and likewise fixed to the gear case. The lid part positions the wiper axially relative to the resistance track. As however on the other hand the wiper, for example, in a force fit, sits on the shaft of the worm gear, the shaft can be provided with end clearance and be pre-stressed resiliently axially against the lid part of the potentiometer. The axial setting of the shaft of the worm gearing is thus determined by the mounting position of the wiper of the potentiometer.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
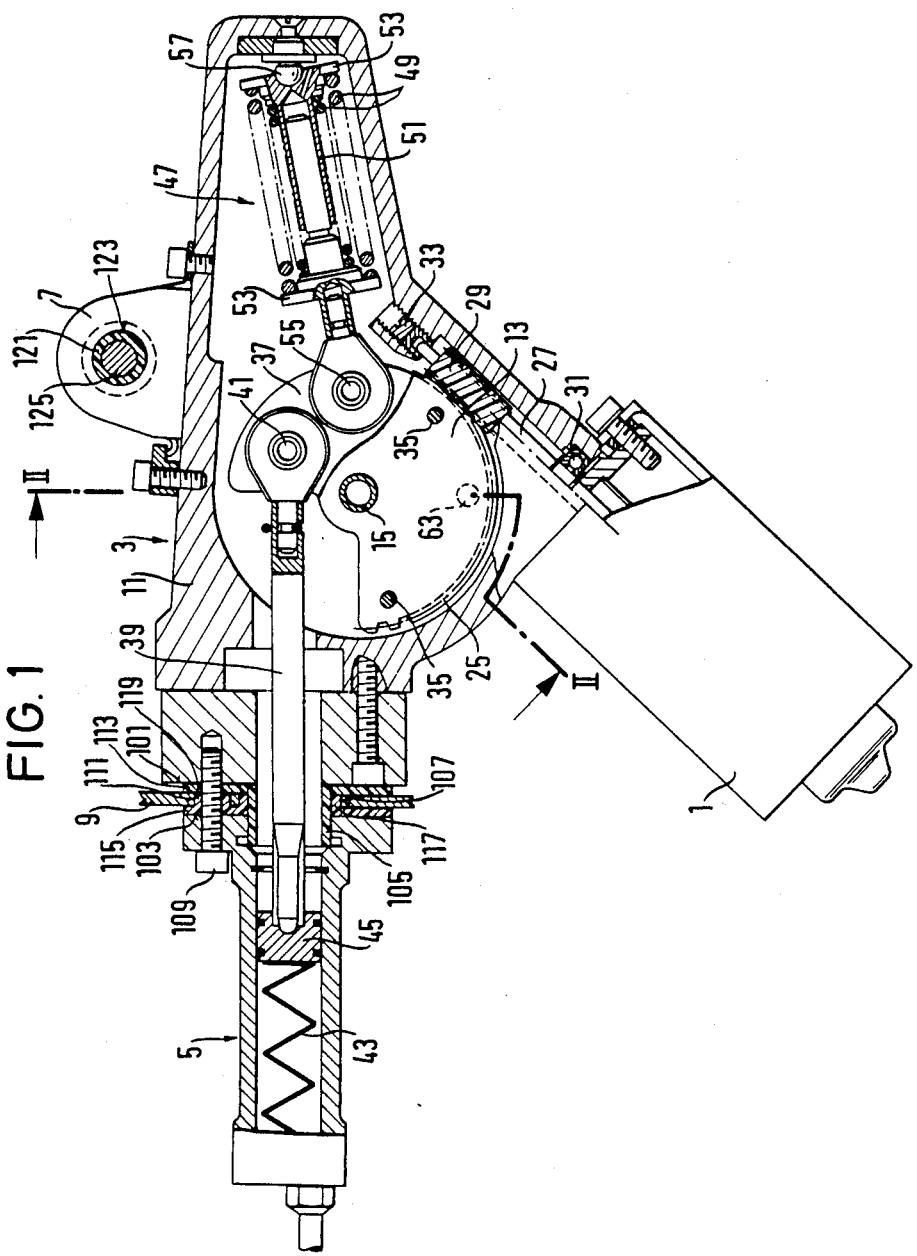
FIG. 1 is partially cut-away side view of an electric-motor-driven control device for a motor-vehicle friction clutch with hydraulically operated release system.
Figure 2:
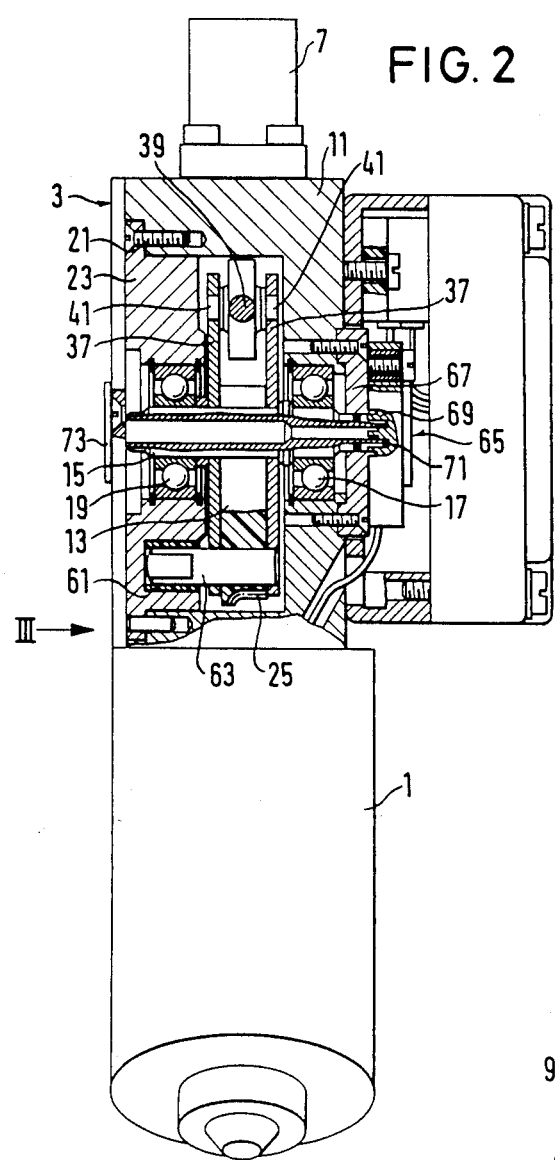
FIG. 2 is a sectional view of the control device, viewed along a line II—II in FIG. 1.
Figure 3:
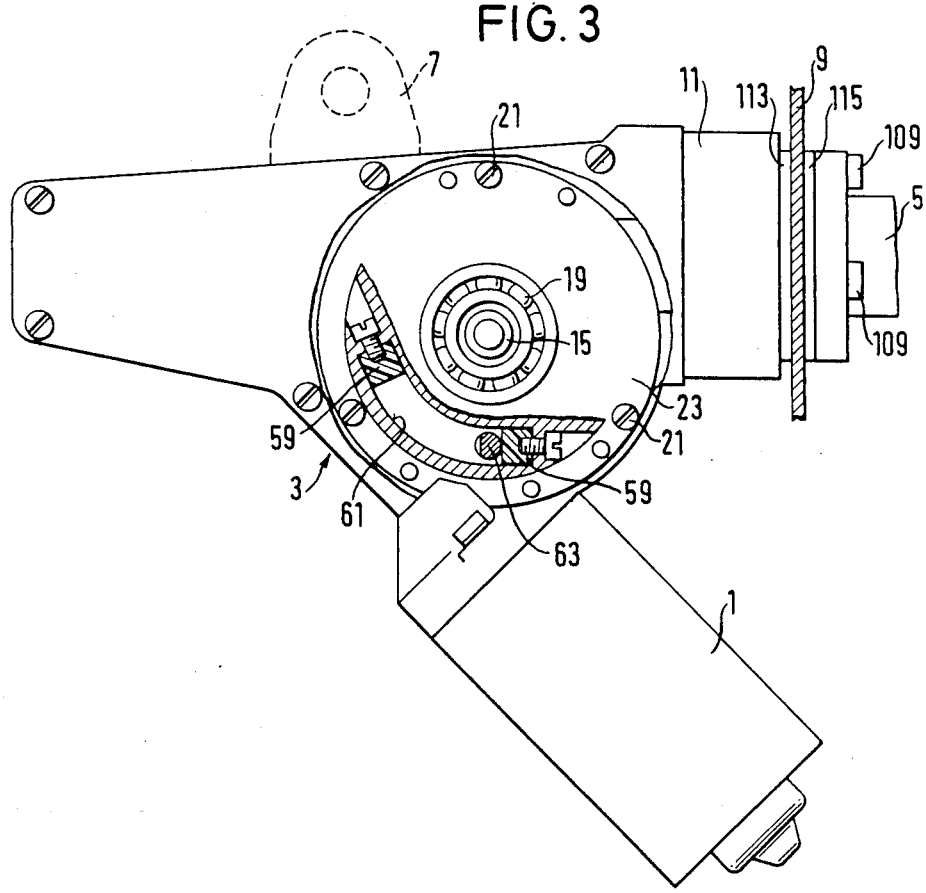
FIG. 3 is a partially cut-away sectional view of the control device, viewed in the direction of an arrow III in FIG. 2.

FIGS. 1 to 3 show an electric-motor-driven control device for a motor-vehicle friction clutch with a hydraulic release system. The control device incorporates an electric motor 1 which actuates through a motion conversion crank gear unit 3 a hydraulic master cylinder 5 of the hydraulic release system of the clutch. The electric motor 1 is part of a traditional servo positioning device, as described for example in the German Patent application No. 34 38 594, and forms together with the crank gear unit 3 and the master cylinder 5 a unit or combined mechanism to be mounted at a suitable point in the motor vehicle by means of an eyelet attachment 7 and frame parts 9 not shown in greater detail.

The motion conversion crank gear 3 is designed as a worm gear unit and has a gear case 11 in which a segmental worm gearwheel 13 is pivoted. The worm gearwheel 13 is mounted non-rotatably on a hollow shaft 15 which is supported on both sides of the worm gearwheel 13 through ball bearings 17, 19 in the gear case 11 and a bearing cover 23 fixed thereto through bolts 21, respectively. The bearing cover 23 closes an opening in the gear case 11 intended for the fitting of the worm gearwheel. A worm 29 sitting directly on a drive shaft 27 of the electric motor 1 meshes with a worm gear toothing 25 provided on the periphery of the worm gearwheel 13. A thrust ball bearing 31 (FIG. 1) absorbs the axial thrust of the worm 29 occurring during the drive in the release direction of the clutch. An adjustment screw 33 guiding the free end of the drive shaft 27 permits the balancing of the end clearance. The segmental worm gearing 13 is made of plastic in order to reduce the friction and is connected firmly with two disc-shaped cheeks 37 arranged on either side. The cheeks are of the same shape and are designed as shaped sheet-metal pieces. Displaced in the peripheral direction against the segmental worm gearwheel 13, the cheeks 37 form a forked seat with which a tappet 39 engages. The tappet 39 is in order to form a crank arm pivoted at a distance from the hollow shaft 15 in both cheeks 37 through an axle 41 and butts with its end turned away from the axle 41 on a piston 45 displaceable in the master cylinder 5 against the pressure of a spring 43.

In the release direction of the clutch the electric motor 1 drives the worm gearing 13 in a direction of rotation in which the tappet 39 executes a substantially translational motion and moves the piston 45 in line of pressure. In engagement direction the electric motor 1 drives the worm gearing 13 in the opposite direction of rotation, so that the tappet 39 is withdrawn from the master cylinder 5, whereby the spring 43 and the hydraulic fluid flowing back out of the slave cylinder of the clutch release system resets the piston 45.

The axis of rotation of the worm 29 lies together with the cylinder axis of the master cylinder 5 in the mid-plane between the two cheeks 37 normal to the axis of rotation of the segmental worm gearing 13. The resultant force exerted by the cheeks 37 on the axles 41 likewise lies in this mid-plane. Thus no tilting force is exerted on the segmental worm gearing 13, which increases the service life and operational safety of the motion conversion crank gear unit 3.

The cylinder axis of the master cylinder 5 extends approximately tangentially to the path of motion of the articulated axle 41 of the tappet 39. On that side of the worm gearing 13 which is substantially diametrically opposite to the master cylinder 5 relative to hollow shaft 15 is located a spring-type energy accumulator 47 (FIG. 1) in the gear case 11. The spring-type energy accumulator 47 incorporates several helical compression springs 49 located coaxially in each other which are clamped buckling-proof on a telescopic guide 51 between end plates 53. The springtype energy accumulator 47 is articulated to the cheeks 37 with an articulation 55 and supported on the gear case with an articulation 57. The line of application of the spring-type energy accumulator 47 likewise occurs in the mid-plane between the cheeks 37, whereby the swivelling axes of the articulations 55, 57 lie in the end position (shown in FIG. 1) of the worm gearing 13 assigned to the engaged clutch, approximately in a plane containing the axis of rotation of the worm gearwheel 13, in order to keep the forces exerted by the spring-type energy accumulator 47 on the worm 29 in this end position as low as possible. Stabilization of this end position is however provided by a slightly off-dead-center position of the articulation 55 opposite to the disengaging direction of rotation of the worm gearwheel 13.

The springs 49 of the energy accumulator 47 are held in the end position of the worm gearing 13 assigned to the engaged position of the clutch. If the electric motor 1 drives the worm gearwheel 13 in the release direction of the clutch, i.e. in FIG. 1 in an anti-clockwise direction, the springs 49 expand and support the drive action of the motor. The clutch can in this way be released quickly even with a comparatively small-sized electric motor 1. In the engagement direction the electric motor 1 reversed in its direction of rotation is supported by the clutch spring, so that in this case also despite comparatively low drive power of the motor the springs 49 of the energy accumulator 47 can again be tensioned. In addition there is more time available for the engagement action of the clutch than for the release action.

The end positions of the worm gearwheel 13 are determined by resiliently mounted buffer stops 59 which are fixed in the end sections of a segment-of-a-circle-shaped groove 61 in the bearing cover 23 and interact with a stop pin 63 projecting from the worm gearing 13 axially into the groove 61.

The angle position of the worm gearing 13 and hence the position of the piston 45 of the master cylinder 5 is recorded by a potentiometer 65 (FIG. 2) whose wiper track holder 67 is fixed, for example bolted, to the gear case 11 and whose wiper 69 sits on one end 71 of the hollow shaft 15 projecting from the gear case 11. The wiper 69 has, as will be explained in greater detail below by means of FIGS. 4 to 6, a wiper boss with tool working surfaces held by force fit on the end 71, for example in the form of a slot, which is available from the side of the gear case 11 opposite to the potentiometer 65 through the hollow shaft 15. The angle position of the wiper 69 can also be rotated relative to the worm gearing 13 with the control device in the fitted state through the opening in the opposite hollow shaft end normally covered by a casing tappet 73, whereby the electric output values of the potentiometer 65 corresponding to the actual position of the piston 45 can be adjusted to the actual fitting conditions of the clutch.

Preferred variants of the control device of FIGS. 1 to 3 will be explained below, with identically operating parts being provided with the reference numerals of FIGS. 1 to 3 and an additional letter for purposes of distinction. The description of FIGS. 1 to 3 should be consulted for a more detailed explanation.

Figure 4:
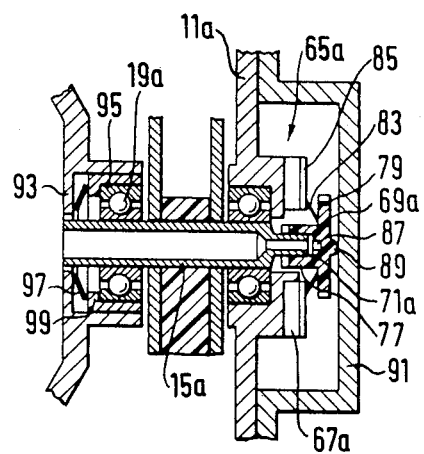
FIG. 4 is a partial view of a variant of a control device according to FIG. 2.
Figure 5:
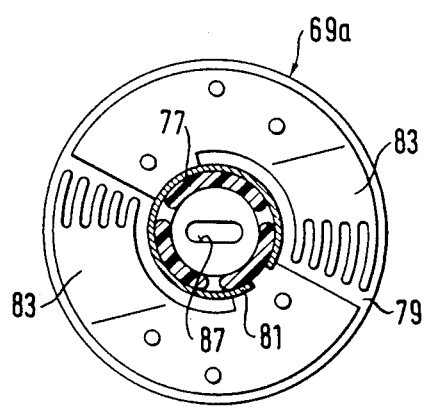
FIG. 5 is a cut-away view of a potentiometer wiper usable in the control device of FIG. 4, viewed along a line V—V in FIG. 6.
Figure 6:
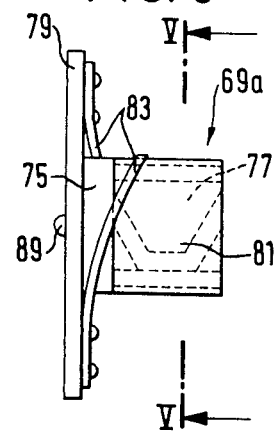
FIG. 6 is a side view of the wiper.

FIGS. 4 to 6 show details of a preferred form of the wiper 69a of the potentiometer 65a, whose wiper track 67a is again fixed to the gear case 11a. The wiper 69 a has a boss body 75 made for example of plastic with an axially slotted sleeve lug 77 and a brush flange 79. The sleeve lug 77 is s onto the end 71a of hollow shaft 15a and bears a washer 81 which generates the radial clamping forces. flange 79 are fixed contact brushes 83 made of plate which rest against resistance track 85 of wiper track holder 65a. In order to avoid having to provide rotational contact connections, two diametrically electrically connected contact brushes 83 are provided, which butt on two separate resistance tracks. Inside the sleeve lug 77 is provided an axially accessible 87 into which a screwdriver or the like can be inserted hollow shaft 15a for the rotational setting of wi 69a.

The axial position of wiper 69a relative to wiper track holder 65a is determined by centric projection 89 on the side of brush flange 79 turned axially away from sleeve lug 77. The projection 89 is supported on a cover 91 of potentiometer 69a which is in turn positioned axially relative to wiper track holder 65a either directly or through gear case 11a. Since in particular with comparatively high clamping forces of wiper 69a the resilience of contact brushes 83 may in certain circumstances not be sufficient to press projection 89 against cover 91, it is provided in the embodiment of FIG. 4 that hollow shaft 15a be supported with end clearance relative to gear case 11a. Between a radial shoulder 93 axial to the side of one of the ball bearings, here ball bearing 19a, and its outer ring 95 is clamped a ring-shaped, axially acting spring 97 which presses hollow shaft 15a through wiper 69a and its projection 89 against cover 91 and thus ensures the correct axial setting of wiper 69a relative to wiper track holder 65a. Spring 97 can rest directly on outer ring 95 or, as shown, through a bearing shell 99 on outer ring 95.

Figure 7:
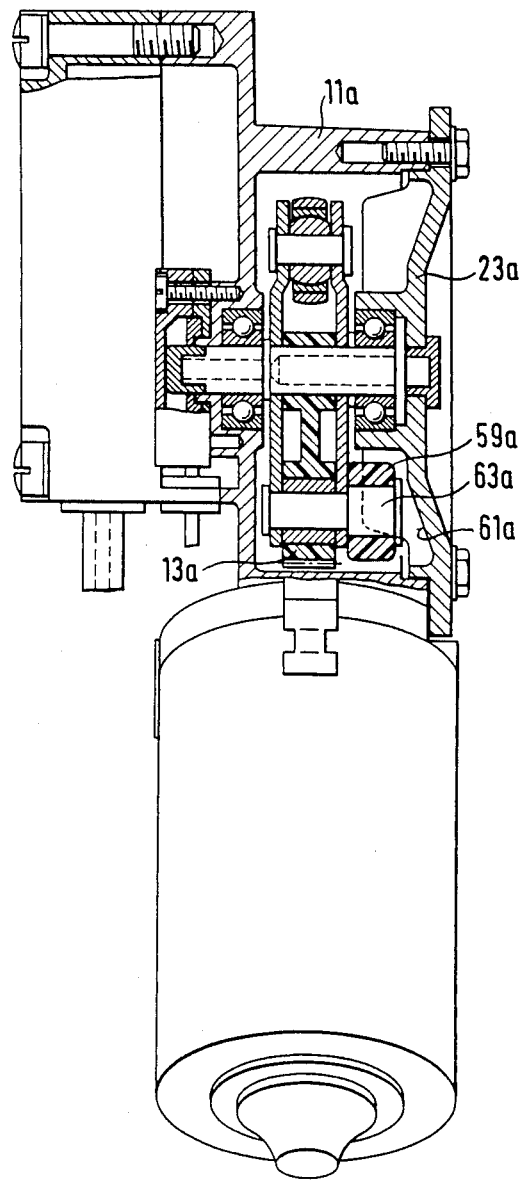
FIG. 7 is a cut-away view similar to the cut-away view in FIG. 2 with a further variant of the control device.

FIG. 7 shows a further variant of the control device of FIGS. 1 to 3, which differs from the latter substantially in the fact that instead of two buffer stops 59 restricting on both sides the range of movement of stop pin 63 a single buffer stop 59a is provided. Buffer stop 59a likewise consists of rubber-elastic material and surrounds in a ring shape stop pin 63a projecting axially from segmental worm gearing 13a. Stop pin 63a again engages with a segment-of-a-circle-shaped cut-out 61a which however in this embodiment is restricted radially through bearing cover 23a on the one hand and gear case 11a on the other. The stop faces situated in the peripheral direction are formed by frames of bearing cover 23a.

The control device is preferably fixed to the splashboard made of sheet-metal designated as 9 in FIGS. 1 and 3, which separates the tonneau from the engine space. Whereas electric motor 1 and motion conversion crank gear unit 3 are located on the tonneau side, master cylinder 5 is situated in the engine space. Gear case 11 and master cylinder 5 are opposite each other with mutually parallel working surfaces 101, 103 and are supported on each other through a stay tube 105. The stay tube 105 surrounds tappet 39 and intrudes through an opening 107 in the splashboard 9 sitting between contact surfaces 101 and 103. Several bolts 109 parallel to tappet 39, which intrude through openings 111 in the splashboard 9, secure master cylinder 5 to gear case 11.

Between the working surfaces 101, 103 of gear case 11 or hydraulic cylinder 5 on the one hand and splashboard 9 on the other are located rubber-elastic ring wheels 113, 115. In addition the openings 107 and 111 in the splashboard 9 are lined with rubber-elastic rings 117, 119. The rubber-elastic parts 113 to 119 ensure a vibration-absorbing fixing of the control device to the splashboard 9 and act as a brake for structure-borne noise.

The same purpose is served by a rubber-elastic ring 121 with which the hole 123 of eyelet attachment 7 is lined. The axis of hole 123 runs parallel with the axis 15 of worm gearwheel 13 and contains in the fitted state preferably a fixing axis 125 on which the brake pedal is mounted in a frame not shown in greater detail. The control device can therefore be fitted without problems in the area traditionally provided for clutch pedals. The elastic materials and attachment points of the suspension system are selected in such a way that the natural frequency lies below the pulse frequency of the motor 1, in order to achieve small movement and an improved noise situation. Discs 113, 115 are so designed that the weight of the control device is absorbed by friction. The rings 117, 119 can be separate from both discs 113, 115, but are best tip-stretched to one of the two discs.

The attachment eye 7 can be by suitable design of the motion conversion crank gear unit 3, the center of gravity of the unit formed crank gear unit 3, motor 1 and master cylinder 5 lies in the vicinity of the splashborad 9. This is the case in particular with embodiments without spring accumulator 47.

While specific embodiments of the invention have been shown and described in detail to illustrate the application of the inventive principles, it will be understood that the invention may be embodied otherwise without departing from such principles.

What is claimed is:

1. A control device, in particular for a motor-vehicle, comprising:
   an electric motor having a drive shaft,
   a substantially translationally movable output member, a crank gear unit converting the rotational motion of the drive shaft into the substantially translational motion of the output member,
   wherein the crank gear unit comprises a gear case forming a combined mechanism with the electric motor, a worm gearwheel pivoted in the gear case, and a worm sitting on the drive shaft of the electric motor and meshing with the worm gearwheel, wherein the output member is mounted eccentrically to the axis of rotation of the worm gearwheel swivellably on the latter, and wherein the axis of rotation of the worm and the resultant force exerted by the worm gearwheel on the output member lie substantially in a common plane normal to the axis of rotation of the worm gearwheel.

2. A control device according to claim 1, wherein the worm gearwheel is designed as a segmental gearwheel toothed on its periphery and, displaced in the peripheral direction towards the area of the toothing, exhibits two cheeks projecting radially relative to the axis of rotation and wherein the output member intrudes between the cheeks and is supported on the cheeks.

3. A control device according to claim 2, wherein the cheeks are designed as sheet-metal, in particular identically-shaped discs and the segmental gearwheel is made of plastic and is located axially between the discs and connected firmly with the latter to form a unit.

4. A control device according to claim 1, wherein on the gear case on the one hand and the worm gearwheel eccentrically to the axis of rotation thereof on the other is mounted through articulations a spring-type energy accumulator in such a way that it increases the torque exerted by the electric motor on the worm gearwheel in a pre-set direction of rotation of the worm gearwheel and is tensioned by the electric motor in the opposite direction of rotation.

5. A control device according to claim 4, wherein the worm gearwheel is swivellable between two end positions and wherein swivelling axes of the worm gearwheel and of the articulations of the spring-type energy accumulator lie in an end position opposite to the pre-set direction of rotation substantially in a common plane.

6. A control device according to claim 5, wherein one articulation connecting the spring-type energy accumulator with the worm gearwheel is located in the end position opposite to the pre-set direction of rotation in an off-dead-center position displaced opposite to the pre-set direction of rotation.

7. A control device according to claim 1, wherein the output member is designed as a tappet and is supported on a piston of a master cylinder of a hydraulic clutch actuation system, said cylinder being held on the gear case.

8. A control device according to claim 7, wherein the master cylinder and the gear case have in the longitudinal direction of the tappet mutually opposite working surfaces and are supported on each other through a spacer which holds the working surfaces apart from each other and wherein between the working surfaces rubber elastic disc parts are located for the vibration-absorbing fixing to a sheet-metal part gripping between the disc parts.

9. A control device according to claim 8, wherein the rubber-elastic disc parts are ring-shaped, wherein the spacer is designed as a tube section and like the disc parts surrounds the tappet, wherein the master cylinder is bolted to the gear case by bolts running parallel to the tappet which extend through openings in the rubber-elastic disc parts, and wherein a rubber-elastic ring part surrounds the spacer between the disc parts.

10. A control device according to claim 8, wherein on the gear case is located a fixing flange for receiving a fixing bolt, said flange exhibiting an opening running roughly parallel with the axis of rotation of the worm gearwheel and being lined with a rubber-elastic ring part.

11. A control device according to claim 1, wherein a stop pin projects axially from the worm gearwheel which engages between two stops located at a distance from each other in a peripheral direction on the gear case.

12. A control device according to claim 11, wherein the stops are designed as rubber-elastic buffers.

13. A control device according to claim 11, wherein the stop pin bears a rubber-elastic buffer ring.

14. A control device according to claim 11, wherein the gear case bears a removable cover which covers the worm gearwheel and the cover contains a segment-of-a-circle-shaped cut-out with which the stop pin engages.

15. A control device according to claim 1, wherein the worm gearwheel is non-rotatably mounted on a shaft pivoted in the gear case and wherein on the gear case is fixed a rotary potentiometer whose wiper sits rotatably adjustable on an axial end of the shaft.

16. A control device according to claim 15, wherein the wiper is a clamp fit on the shaft.

17. A control device according to claim 15, wherein the shaft is designed as a hollow shaft and is accessible operationally on the side opposite the wiper and the wiper exhibits tool working surfaces accessible through the hollow shaft.

18. A control device according to claim 15, wherein the shaft has end clearance and the wiper is axially supported on its side axially turned away from the shaft in a centric axial bearing on a lid part covering the potentiometer and connected with the gear case.

19. A control device according to claim 18, wherein the shaft is pivoted through a ball bearing in the gear case, whose inner ring is non-rotatably mounted on the shaft and whose outer ring is mounted axially displaceable in a bearing opening of the gear case, and wherein a ringshaped, axially acting spring, which is gripped between the gear case and the outer ring, pre-loads the shaft axially onto the lid part.

* * * * *